(12) United States Patent
Heilemann et al.

(10) Patent No.: US 11,438,704 B2
(45) Date of Patent: Sep. 6, 2022

(54) METHOD, SYSTEM AND DEVICES FOR SELECTIVE MODAL CONTROL FOR VIBRATING STRUCTURES

(71) Applicant: The University of Rochester, Rochester, NY (US)

(72) Inventors: Michael Charles Heilemann, Rochester, NY (US); Mark Frederick Bocko, Caledonia, NY (US); David Allan Anderson, Rochester, NY (US)

(73) Assignee: THE UNIVERSITY OF ROCHESTER, Rochester, NY (US)

( * ) Notice: Subject to any disclaimer, the term of this patent is extended or adjusted under 35 U.S.C. 154(b) by 0 days.

(21) Appl. No.: 16/592,368

(22) Filed: Oct. 3, 2019

(65) Prior Publication Data

US 2020/0120427 A1 Apr. 16, 2020

Related U.S. Application Data

(60) Provisional application No. 62/745,307, filed on Oct. 13, 2018.

(51) Int. Cl.
| | |
|---|---|
| H04R 25/00 | (2006.01) |
| H04R 17/10 | (2006.01) |
| F16F 7/10 | (2006.01) |
| G05D 19/02 | (2006.01) |
| H04R 1/28 | (2006.01) |
| H04R 17/00 | (2006.01) |
| H04R 7/04 | (2006.01) |

(52) U.S. Cl.
CPC ............ *H04R 17/10* (2013.01); *F16F 7/1011* (2013.01); *G05D 19/02* (2013.01); *H04R 1/2803* (2013.01); *H04R 1/2869* (2013.01); *H04R 7/045* (2013.01); *H04R 17/005* (2013.01); *H04R 2440/05* (2013.01)

(58) Field of Classification Search
CPC ...... H04R 17/005; H04R 1/28; H04R 1/2803; H04R 1/2807; H04R 17/10; H04R 1/2869; H04R 2440/05; H04R 7/045
USPC ........................................................ 381/190
See application file for complete search history.

(56) References Cited

U.S. PATENT DOCUMENTS

| | | | | |
|---|---|---|---|---|
| 5,315,661 A | * | 5/1994 | Gossman | G10K 11/1785 381/71.1 |
| 5,519,637 A | * | 5/1996 | Mathur | G01H 1/00 700/280 |

(Continued)

FOREIGN PATENT DOCUMENTS

| | | | | |
|---|---|---|---|---|
| WO | WO-2013171512 A2 | * | 11/2013 | G06F 3/0436 |
| WO | 2017031422 | | 2/2017 | |

OTHER PUBLICATIONS

International Search Report and the Written Opinion of the International Searching Authority of Application No. PCT/US2019/054513 dated Jan. 14, 2020.

*Primary Examiner* — Phylesha Dabney
(74) *Attorney, Agent, or Firm* — Ping Wang; Rimon Law

(57) ABSTRACT

A method, system and devices to selectively control modal vibrations in an elastic panel with a number of force actuators distributed throughout the surface of the elastic panel to excite/depress the response of one or more vibrational resonant modes included in a prescribed subset. The force actuators are disposed such that prescribed modal excitation/depression may be realized when the actuators are driven by a common source signal.

27 Claims, 11 Drawing Sheets

(56) References Cited

U.S. PATENT DOCUMENTS

| | | | |
|---|---|---|---|
| 6,332,029 B1 * | 12/2001 | Azima | H04R 1/021 |
| | | | 381/152 |
| 2018/0113513 A1 | 4/2018 | Harris et al. | |
| 2020/0120427 A1 * | 4/2020 | Heilemann | G05D 19/02 |

* cited by examiner

Normalized Driver Locations

| Normalized Actuator Positions | | |
|---|---|---|
| Actuator | Horizontal | Vertical |
| D1 | 0.250 | 0.667 |
| D2 | 0.750 | 0.667 |
| D3 | 0.250 | 0.333 |
| D4 | 0.750 | 0.333 |

| Mode | Pressure (Pa) | Nodal Lines |
|---|---|---|
| (1,1) | 0.0000 | |
| (2,1) | 3.4641 | |
| (1,2) | 0.0000 | |
| (3,1) | 0.0000 | |
| (2,2) | 0.0000 | |
| (3,2) | 0.0000 | |
| (4,1) | 0.0000 | |
| (1,3) | 0.0000 | |
| (2,3) | 0.0000 | |

METHOD, SYSTEM AND DEVICES FOR SELECTIVE MODAL CONTROL FOR VIBRATING STRUCTURES

This application claims priority from U.S. Provisional Application Ser. No. 62/745,307, filed Oct. 13, 2018. The entirety of the aforementioned application is incorporated herein by reference.

FIELD

This application relates to a control system for structures where one or more force actuators are employed to excite or depress structural vibration, and/or radiated sound.

BACKGROUND

Force actuators have been employed for a number of years to excite/depress the response of one or more vibrational resonant modes in structures. Techniques for modal excitation/depression can take a number of forms. One such form is active vibration control with feedback, where the response of the structure to a disturbance is first estimated using a number of sensors distributed on the structure. The sensor signals are sent to a controller, which interprets the sensor signals, and then in response, sends a separate drive signal(s) to one or more force actuators distributed on the structure to reduce or excite the contributions of certain vibrational resonant modes. The controller then interprets the corresponding structural response via the sensors, and adjusts the drive signal(s) as needed.

Alternatively, if the vibrational resonant modes of the structure and the disturbance are known, an array of force actuators may be disposed on the structure to give a prescribed response for a particular subset of modes. For example, when developing a flat-panel loudspeaker using the modal crossover technique, as described in U.S. application Ser. No. 15/753,679, which is incorporated herein by reference, the actuator array is configured to excite bending modes with desirable sound radiation properties, such as the lowest bending mode of a simply-supported rectangular panel, and depress modes with undesirable sound radiation properties.

Regardless of the technique used for selective modal control, the drive signals applied to the force actuators are dependent on the position of the actuators relative to the nodal lines of each vibrational resonant mode. For a given drive signal, an actuator located near a nodal line will exert relatively little force on a particular mode, while an actuator located on an antinode will exert maximum force on the mode. Since these control techniques are designed to address a number of modes simultaneously, the relative amplitudes of the signals applied to each actuator must be weighted by their position relative to the nodal lines of each mode using a weighting function to achieve a prescribed vibrational response. For an arbitrary array layout, implementing the weighting function would require a number of additional electronics, which can add to the cost of manufacturing and decrease the reliability of the product.

Therefore, there is need for devices, systems and methods that overcome the challenges of producing sound absent unwanted distortions in a manner that is simpler and more cost-effective.

SUMMARY

An aspect of the application is a device for radiating sound, comprising: a panel, wherein the panel possesses one or more vibrational resonant modes; a plurality of dynamic force actuators, wherein the dynamic force actuators are positioned in an array at locations on the panel that are determined to significantly actuate a selected panel mode in a given frequency range while minimizing the excitation of all other modes in the selected frequency range, wherein the selected mode is driven with significant force when the actuators are applying equal force to the panel; and a common signal source, wherein the source is connected to the plurality of dynamic force actuators, and wherein a signal is received by each of the plurality of force actuators from the common signal source, and further wherein the dynamic force produced by the plurality of force actuators upon the panel generates a radiation of sound from the panel in a selected frequency band. Often, for the purpose of radiating sound from the panel in a selected panel mode is the lowest mode of vibration of the panel in which all points of the panel move in phase with one another, i.e., there are no nodal lines in the panel surface apart from the boundaries.

Another aspect of the application is a method of controlling radiation of sound, comprising the steps of: selecting a panel, wherein the panel possesses one or more vibrational resonant modes; positioning a plurality of dynamic force actuators, wherein the dynamic force actuators are positioned in an array at optimized locations on the panel to significantly actuate a selected panel mode in a given frequency range while minimizing the excitation of all other modes in the selected frequency range, wherein the selected mode is driven with significant force when the actuators are applying equal force to the panel; linking a common signal source to the plurality of dynamic force actuators via a modal crossover network; receiving a signal from the common signal source, wherein the signal is received by each of the plurality of force actuators; and applying a dynamic force generated by the plurality of force actuators upon the panel to output a radiation of sound from the panel, wherein the sound is in a selected frequency band.

Another aspect of the application is a method of radiating sound by the device or system described herein, which may be comprised of any one of the various embodiments described herein, comprising the steps of: positioning the device or system described herein inside or outside a mobile structure; radiating sound using the device of the present application inside or outside the mobile structure. In certain embodiments, the mobile structure is a transportation vehicle. In certain embodiments, the mobile structure is a mobile electronic device. In certain embodiments, the mobile structure is an acoustic radiator.

Another aspect of the application is a system for controlling the radiation of sounds, comprising: a device as described herein, which may be comprised of any one of the various embodiments described herein; a programmable computer processor, wherein the computer processor is networked to the device described herein, and further wherein the computer processor controls the signal produced by the common signal source of the device.

There are a variety of embodiments which may be embodied separately or together in combination in the various aspects of this application; an independent listing of an embodiment herein below does not negate the combination of any particular embodiment with the other embodiments listed herein in practicing the various aspects of the application.

In certain embodiments, the device has a panel that is flat and has a shape selected from the group consisting of circular, rectangular or square. In certain embodiments, the device has a common signal source which is a single amplifier.

In certain embodiments, the actuators are positioned on the structure to address a prescribed subset of vibrational resonant modes. In certain embodiments, the actuators are positioned to cancel the excitation of one or more of the panel's vibrational resonant modes included in the prescribed subset.

In certain embodiments, the actuators are positioned such that they lie on nodal lines, or are so disposed in anti-nodal regions such that the net force acting on selected panel modes approaches zero. In certain embodiments, the prescribed modal set comprises of all the panel modes that resonate within a prescribed bandwidth. In certain embodiments, the force actuators are wired in selected series/parallel configurations to produce a target total electrical impedance. In certain embodiments, the array is employed in conjunction with one or more independently driven individual force actuators on the panel.

In certain embodiments, the force actuators are electromagnetic coil drivers. In certain embodiments, the force actuators comprise piezoelectric materials. In certain embodiments, the dynamic force actuators are positioned in an array at optimized locations on the panel to significantly actuate only the lowest panel mode in a given frequency range. In certain embodiments, a modal crossover network connects the plurality of dynamic force actuators, and wherein the common signal source is connected to the plurality of dynamic force actuators via the modal crossover network.

In certain embodiments, the piezoelectric materials comprise ceramic. In certain embodiments, the piezoelectric materials comprise organic polymers. In certain embodiments, the organic polymers comprise polyvinylidene fluoride (PVDF). In certain embodiments, the signal is selected from the group consisting of digital, analog, partially digital, and partially analog signal.

In certain embodiments, the signal is an audio signal. In certain embodiments, the signal comprises information selected from one or more of speech, music, and other naturally occurring sounds, or artificially synthesized sounds.

In certain embodiments, the system further comprises a data receiver, wherein the data receiver is networked to the programmable computer processor, and further wherein data that is input into the system via the data receiver is transformed into the signal output by the common signal source of the device. In certain embodiments, the data receiver is a microphone. In certain embodiments, the data receiver is a mobile electronic device or a vibration sensor.

Figure 1:
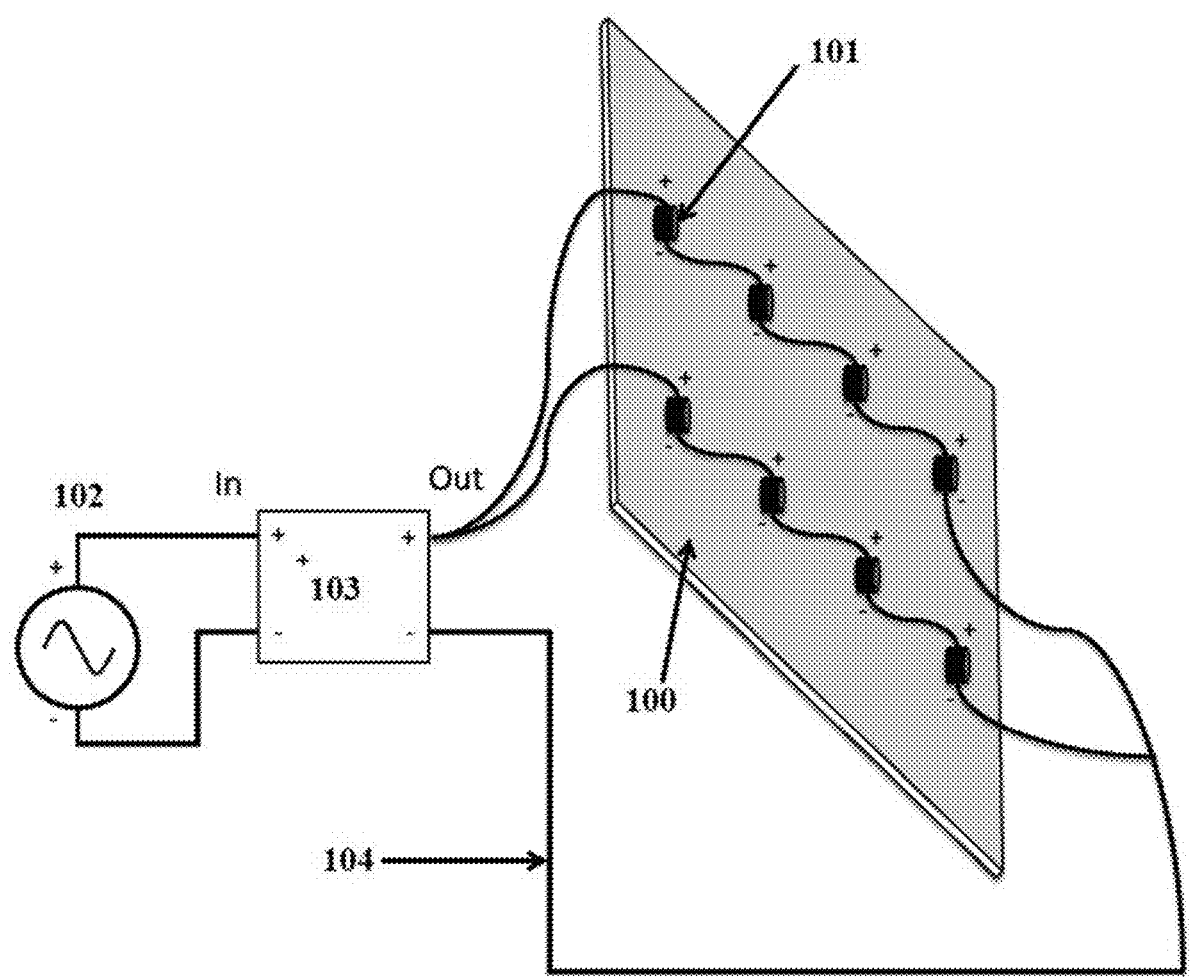
FIG. 1 is a structure with force actuators arranged to excite/depress a set of vibrational resonant modes when driven by the input signal via the amplifier.

While the present disclosure will now be described in detail, and it is done so in connection with the illustrative embodiments, it is not limited by the particular embodiments illustrated in the figures and the appended claims.

DETAILED DESCRIPTION OF THE INVENTION

Reference will be made in detail to certain aspects and exemplary embodiments of the application, illustrating examples in the accompanying structures and figures. The aspects of the application will be described in conjunction with the exemplary embodiments, including methods, materials and examples, such description is non-limiting and the scope of the application is intended to encompass all equivalents, alternatives, and modifications, either generally known, or incorporated here. Unless otherwise defined, all technical and scientific terms used herein have the same meaning as commonly understood by one of ordinary skill in the art to which this application belongs. One of skill in the art will recognize many techniques and materials similar or equivalent to those described here, which could be used in the practice of the aspects and embodiments of the present application. The described aspects and embodiments of the application are not limited to the methods and materials described.

As used in this specification and the appended claims, the singular forms "a," "an" and "the" include plural referents unless the content clearly dictates otherwise.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself This application describes a control system for structures where one or more force actuators are employed to excite or depress structural vibration, and/or radiated sound. In particular, the present application discloses a system and method of placing dynamic force actuators on a flat panel such that when they are all supplying an equal pressure on the panel preferably only the lowest mode is significantly actuated within a given frequency range.

If the vibrational resonant modes of the structure are known, an array of force actuators may be disposed on the structure to give a prescribed response for a particular subset of modes. The drive signals applied to the force actuators are dependent on the position of the actuators relative to the nodal lines of each vibrational resonant mode. For a given drive signal, an actuator located near a nodal line will exert relatively little force on a particular mode, while an actuator located on an antinode will exert maximum force on the mode.

An optimization method is described herein for determining the placement of actuators such that they significantly excite a selected mode while depressing the other modes in a desired subset of structural modes when driven by a common source. The need for a weighting function, and the additional costs associated with implementing the weighting function for selective modal excitation are eliminated by optimizing the placement of the force actuators.

The System

Figure 2:
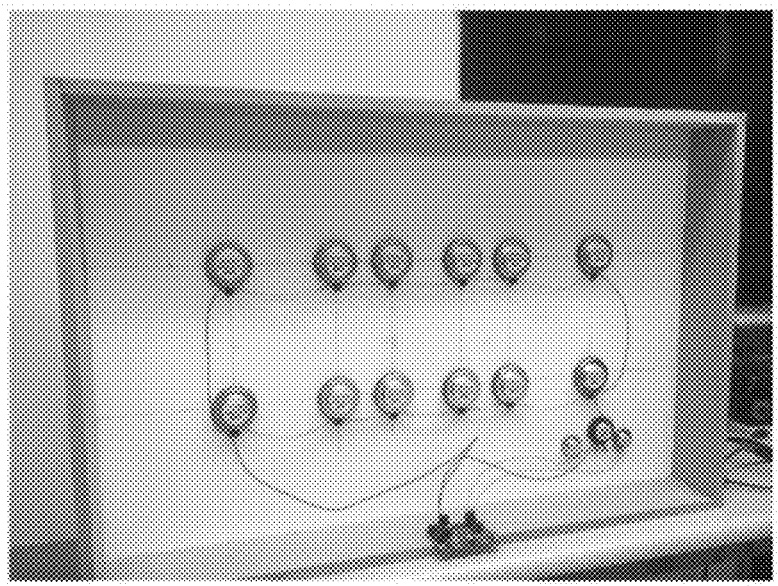
FIG. 2 shows two panel structures of different aspect ratios arranged with an array of twelve force actuators operating in conjunction with independently driven individual actuators.
Figure 2:
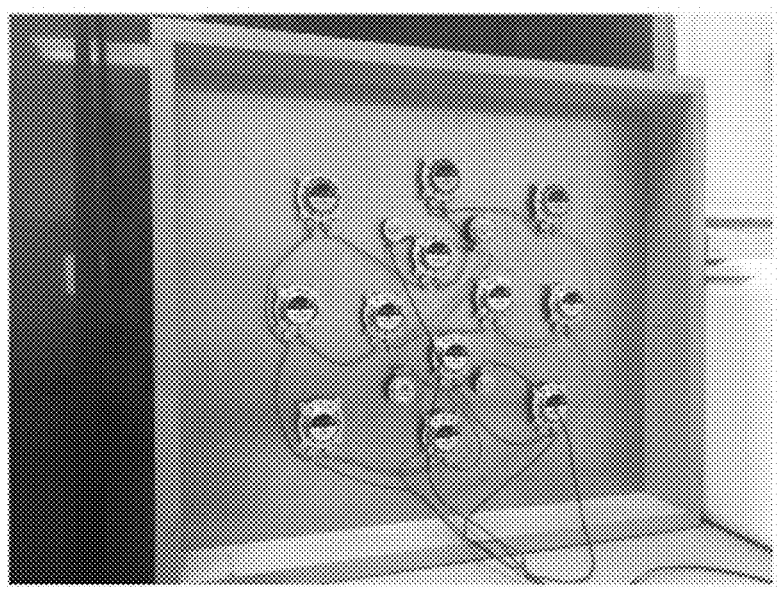

FIG. 1 shows a particular embodiment of the system described herein. The structure (100) is an elastic panel with force actuators (101) arranged upon it to exert pressure upon the panel to excite/depress a set of vibrational resonant modes when driven by the input signal (102) via the amplifier (103) networked to the actuators by a wire (104). The system may also comprise a computer network, including a computer processor (not shown). One of ordinary skill will understand that pressure as referred to herein is force per unit area and the force actuators apply equal pressure (e.g., force per unit area) at each of their points of contact with the elastic panel. One of ordinary skill will understand that the force actuators are designed to have full contact with the panel in an equal and consistent manner, so as to avoid differences in the contact areas between the actuators and the panel. Ensuring that there are no differences in contact area between the actuators and the panel avoids the application of different forces by different actuators to the elastic panel. FIG. 2 shows a pair of working embodiments of the system of FIG. 1.

The panel used in the method, device and systems herein is an elastic panel. The panel can be made of materials including, but not limited to, partially or fully from aluminum, glass, wood, plastics, both ferrous and non-ferrous metals, combinations thereof, and the like, and other materials having elasticity. Certain embodiments described herein below use an acrylic panel with 4, 8, and 11 actuators that demonstrate successful operation of the actuator arrangements. However, one of ordinary skill will understand that the method, device and systems described herein are not limited to use of an acrylic panel.

In the method, device or systems described herein, an array of force actuators excites the flexural vibrations of an elastic panel. Each individual force actuator in itself is not a sound amplifying device and does not radiate appreciable acoustic energy by itself. However, when a force actuator is mounted to an elastic panel, as described herein, bending vibrations of the elastic panel are excited, which in turn leads to the radiation of acoustic energy by the vibrating elastic panel. If a single force actuator is driven by an audio signal it excites the entirety of the elastic plate and sound will be radiated by the entire panel. If one were to employ a single force actuator mounted to an elastic panel, the higher order bending modes of the elastic panel would be excited unavoidably.

Force actuators in an array work together to avoid the excitation of higher order bending modes of the panel. Preferably, only the lowest order bending mode of the panel is excited and exciting other bending modes is avoided, since this can lead to sonic distortions. The manner in which the audio signal is divided into frequency bands and the force actuator signals are controlled to achieve the controlled excitation of certain panel modes, while explicitly avoiding the excitation of unwanted panel modes, is through the "modal crossover" method.

The key function of a "modal crossover network" is to employ an array of force actuators to control which bending modes of the vibrating panel are excited. In embodiments using a modal crossover network, signals in different frequency ranges are sent to the individual force actuators with varying gain factors chosen to excite specific modes of vibration of the elastic panel, the entire surface of which then radiates sound. The signals sent to the array of actuators are scaled appropriately so that the plurality of actuators will excite a specific vibrational mode of the elastic panel. For example, to excite the lowest vibrational mode of an elastic panel the actuators nearer to the center of the panel should have higher gain factors, those closer to the boundaries should employ lower gain.

In certain embodiments, the method, system and devices described herein may be used without a modal crossover network. Furthermore, although it is preferred that the elastic panel be excited in its lowest bending mode, while canceling the response of all other modes within the set, the method, system and devices described herein are not limited by this preference.

In other embodiments, the method, system and devices described herein may be used to excite a panel mode, or combination of modes, other than the fundamental vibrational resonant mode (e.g., for purposes of noise canceling). One of ordinary skill will understand how to adapt the method, system and devices described herein to individually excite any of the panel modes within the set of panel modes. The method, system and devices described herein are not limited to excitation of the fundamental vibrational resonant mode, but may be extended for any mode within the set.

Figure 3:
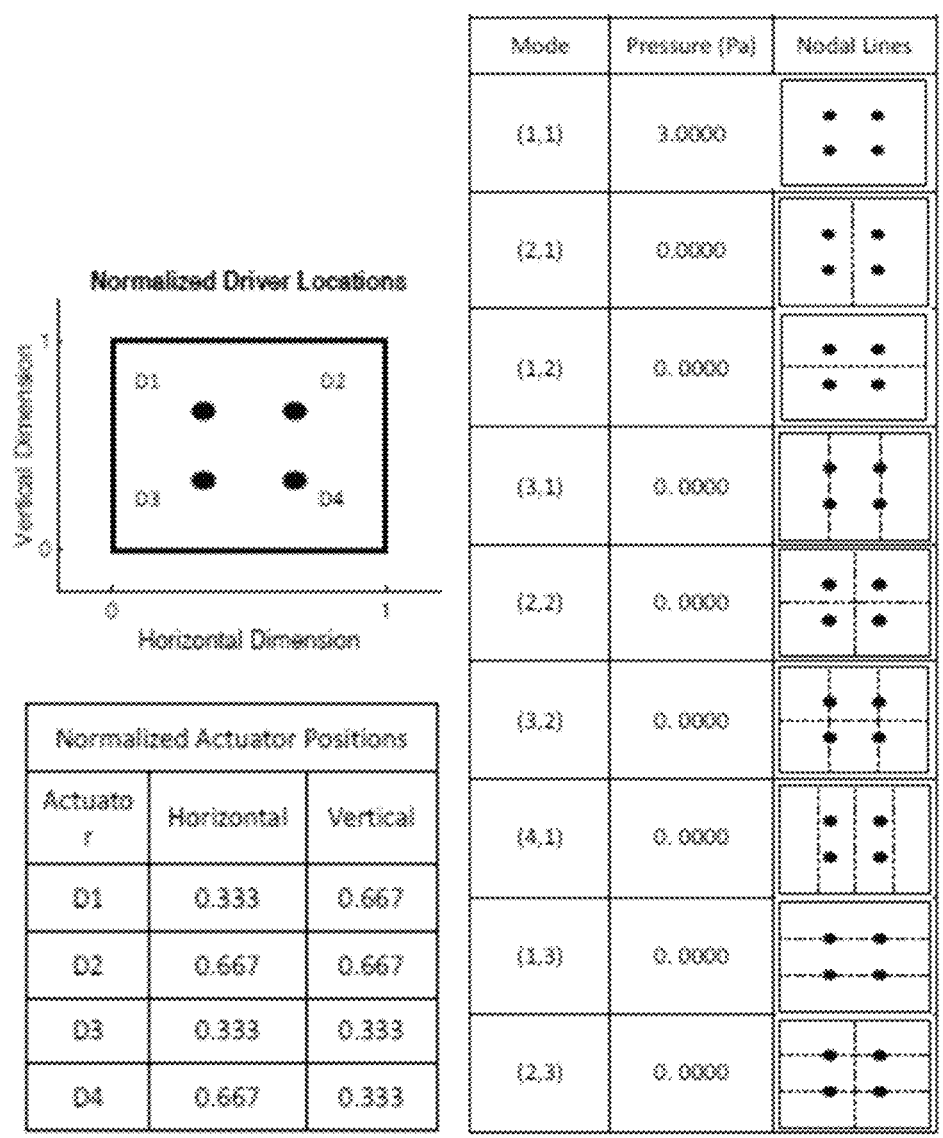
FIG. 3 is an example layout with four actuators configured to excite the (1,1) mode of a rectangular panel and depress the excitation of a number of other modes.
Figure 4:
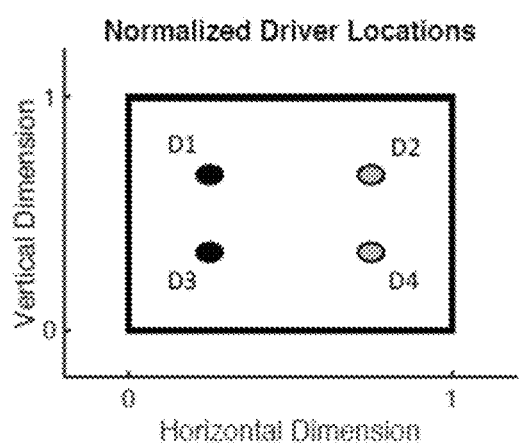
FIG. 4 is an example layout with four actuators configured to excite the (2,1) mode of a rectangular panel and depress the excitation of a number of other modes.
Figure 5:
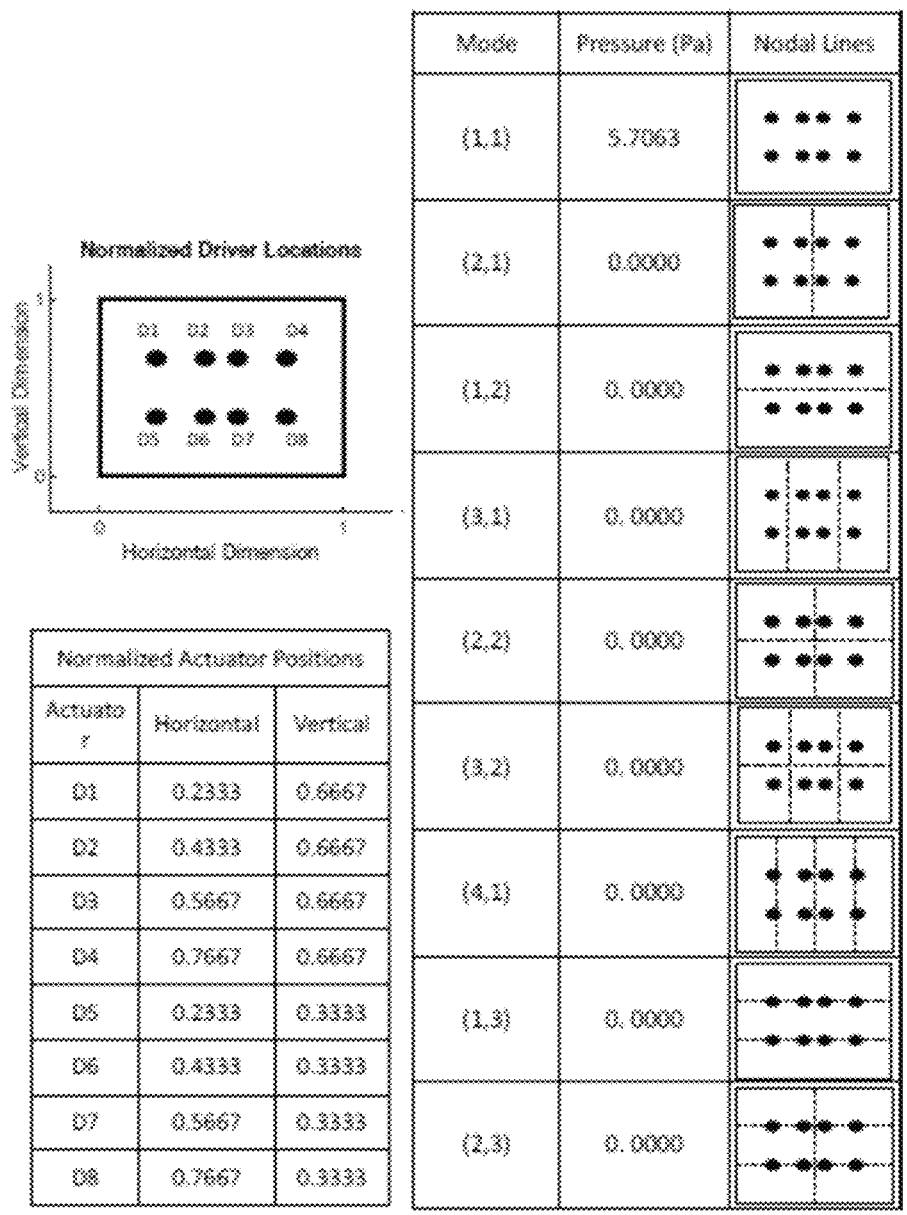
FIG. 5 is an example layout with eight actuators configured to excite the (1,1) mode of a rectangular panel and depress the excitation of a number of other modes.
Figure 6:
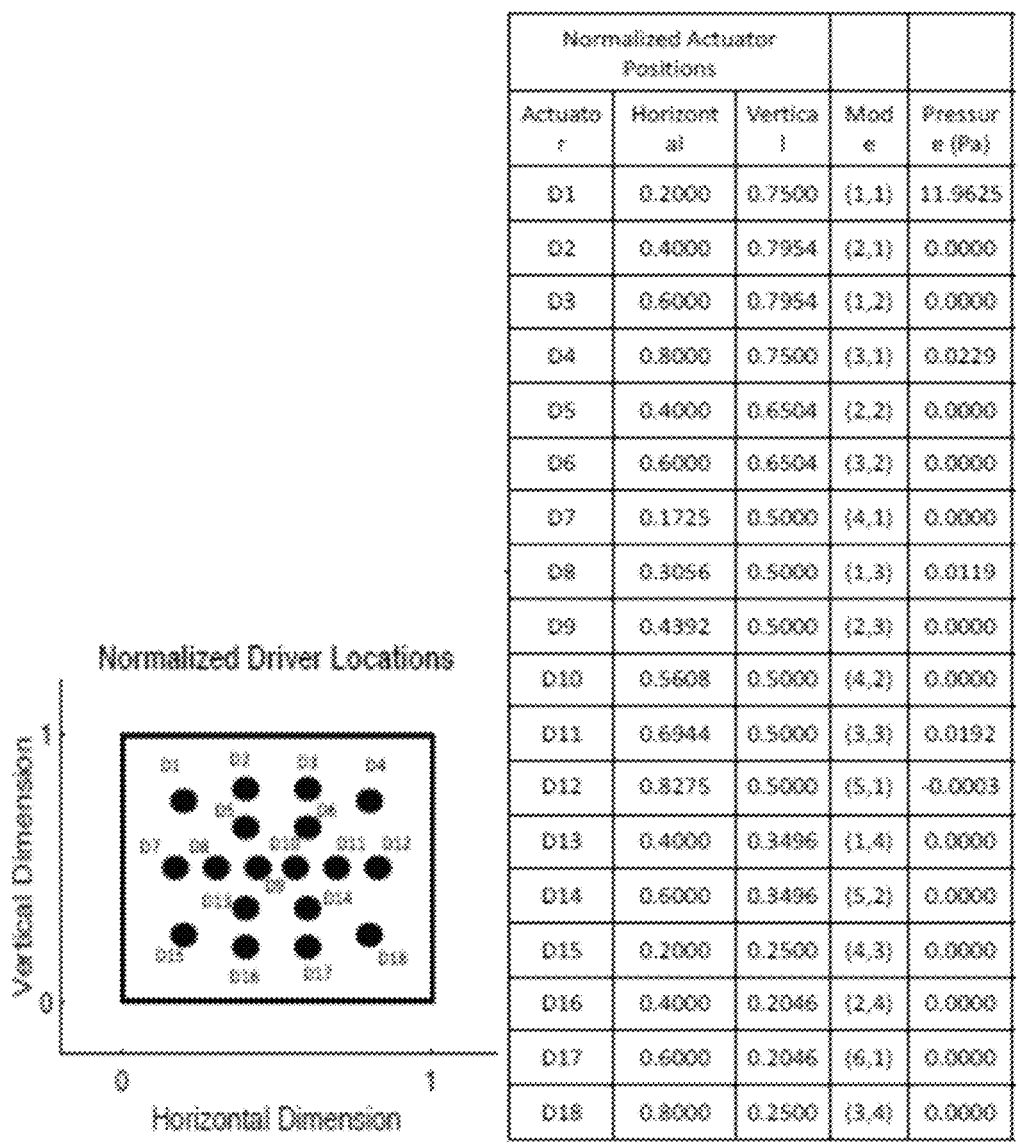
FIG. 6 is an example layout with eighteen actuators configured to excite the (1,1) mode of a rectangular panel and depress the excitation of a number of other modes.

FIGS. 3-6 show example layouts with differing numbers of actuators configured to excite the particular modes of a rectangular elastic panel and depress the excitation of a number of other modes. In particular, in comparing FIG. 3 and FIG. 4, one can observe that the shifting in position of the actuators on the panel relative to the nodal lines of the panel results in the excitation/depression of different panel modes. In FIG. 3, the (1,1) mode is excited by 3.000 Pa, while all other modes are canceled; in FIG. 4, the (2,1) mode is excited by 3.4641 Pa, while all other modes are canceled. In FIG. 5, although eight force actuators are used, their positioning is such that only the (1,1) mode is excited, while all others are canceled. In FIG. 6, which used eighteen force actuators, it can be observed that the panel is most significantly excited in the (1,1) mode, with the other modes being canceled (or very marginally excited).

One of ordinary skill will understand that the method, system and devices described herein are not limited by the particular shape or size of the panel. The flat elastic panel may be circular, square, rectangular, etc. Preferably, the flat panels have edges that are either simply supported or clamped in contrast to distributed-mode loudspeakers, whose edges are generally assumed to be free or elastically supported.

Vibroelastic Behavior of Elastic Panels

Eq. (1) is used to describe the vibroelastic behavior of a forced plate with dimensions $L_x$ by $L_y$ [Cremer, L., Heckl, M., and Peterson, B., Structure-Borne Sound, Springer, 3 edition, 2005]. The externally applied pressure distribution on the plate is represented by p(x,y,t), and the spatially distributed out-of-plane displacement of the panel is represented by u(x,y,t), where (x,y) is the location on the panel and t refers to time. The notation ü(x,y,t) represents the second temporal derivative of u(x,y,t). D is a quantity referred to as the 'bending stiffness' of the panel, p is the density of the panel material, and h is the panel thickness.

$$D\nabla^4 u(x,y,t) + \rho h \ddot{u}(x,y,t) = p(x,y,t) \quad (1)$$

Modal Decomposition

The Rayleigh-Ritz solution to (1) above considers the plate's displacement profile to be the sum of an infinite number of orthogonal vibrational modes [Fuller, C., Elliott, S., and Nelson, P., Active Control of Vibration, Associated Press, 1996] and is given in Eq. (2) below. The actual shapes of the modes and their second order resonant behavior are subject to the boundary conditions of the panel [Berry, A., Guyader, J.-L., and Nicolas, J., "A General Formulation for the Sound Radiation from Rectangular, Baffled Plates with Arbitrary Boundary Conditions," J. Acoust. Soc. Am., 88(6), pp. 2792-2802, 1990; Fletcher, N. H. and Rossing, T. D., The Physics of Musical Instruments, Springer, 2 edition, 1998; Li, W. L., "Vibroacoustic analysis of rectangular plates with elastic rotational edge restraints," Journal Acous. Soc. Am., 120(2), pp. 769-779, 2006]. The mode shape functions will be referred to as $G_r(x,y)$, with r being the mode index. The amplitude of each mode is represented by $A_r$. Often, two-dimensional structures make use of two modal indices, such as m and n; however, it is assumed that the modes are indexed using r which represents the ordering of their resonant frequencies with no loss of generality.

$$u(x, y, t) = \sum_r A_r G_r(x, y) e^{j\omega t}. \quad (2)$$

To determine $A_r$, the externally applied pressure distribution p(x,y,t) is considered to be comprised of an array of N actuator elements whose dimensions are small relative to the bending wavelength on the panel in the frequency range of interest, indexed using the letter n. The small size allows approximation of the pressure distribution from each driver as $\delta(x-x_n)\delta(y-y_n)$, where the actuator is positioned at $(x_n, y_n)$. Each actuator element produces a force represented by $f_n$, scaled by the factor $4/L_x L_y$ to obtain the relevant pressure on the panel [Anderson, D., Heilemann, M. C., and Bocko, M. F., "Flat-Panel Loudspeaker Simulation Model with Electromagnetic Inertial Exciters and Enclosures," Journal Audio Eng. Soc., 2017]. The actual pressure applied to any given mode, $P_r$, depends on the location of the actuator; for example, an actuator placed at the node of a given mode will not be able to excite that mode. In the low-frequency case of actuators whose dimensions are negligible compared with the modal wavelength, the driver-to-mode 'coupling factors', which scale the pressure on the mode supplied by the actuator based on location, are given by $G_r(x_n, y_n)$.

In the case that N actuators are applying force to the panel, the total pressure on a given mode, $P_r$, is simply the sum of every actuator's pressure on that mode. The respective total pressures on R modes is expressed in matrix form as $$\begin{bmatrix} P_1 \\ P_2 \\ \vdots \\ P_R \end{bmatrix} = \begin{bmatrix} G_1(x_1, y_1) & G_1(x_2, y_2) & \dots & G_1(x_N, y_N) \\ G_2(x_1, y_1) & G_2(x_2, y_2) & \dots & G_2(x_N, y_N) \\ \vdots & \vdots & \vdots & \vdots \\ G_R(x_1, y_1) & G_R(x_2, y_2) & \dots & G_R(x_N, y_N) \end{bmatrix} \begin{bmatrix} \frac{4f_1}{L_x L_y} \\ \frac{4f_2}{L_x L_y} \\ \vdots \\ \frac{4f_N}{L_x L_y} \end{bmatrix}. \quad (3)$$

In certain embodiments, the actuator locations are determined by minimizing the ratio of high-order mode pressures to the lowest mode pressure when all actuators supply equal pressure.

Optimization Method

An optimization method is described herein for determining the placement of force actuators on the surface of an elastic panel such that they are all driven by a single amplifier yet only excite a single structural mode in the elastic panel. "Optimized" herein means that a search is performed to find the actuator locations that maximize the ratio of the force on the mode that is selected to be excited vs. the sum total of the forces on the modes that are non-selected. Preferably, for loudspeakers, the lowest mode is excited.

It is preferable that for a set of N actuators, the N lowest modes should all have a force of 0 (or nearly 0) aside from the mode that the array is intended to excite. Preferably, the force on the selected mode to be excited is at least ten times greater than the force on any of the other N modes. For example, in Table 1 below, the lowest mode has an infinitely higher force than the others in the set. Driver configurations (and hence the relative forces exerted on each mode) will change depending on the number of actuators used. In Table 1 below, the force on the lowest mode increases as the number of actuators increases. Note that a user can only specify the force on one mode per actuator used.

Referring to the four actuator case in Table 1 below, the first four modes all have a force of 0 other than the lowest mode. In the eight actuator case, the first eight modes all have a force of 0 other than the lowest mode. The same is true for the eleven actuator case. It may also be observed that some modes other than the first 4/8/11 also have a force of 0. This depends on the number of drivers used and the aspect ratio of the panel. The symmetry of the optimized actuator layout may allow modes outside of the set to also be depressed. For example, in FIG. 3, the 5th mode (2,2) experiences a force of 0 (even though there are only four actuators) due to the symmetry of the optimized layout relative to the nodal lines of that particular mode.

However, the optimization method described herein can generally work for any mode, not just the lowest. There are two changes that must be made to the algorithm to extent its scope of use to any selected mode. The first is that P1 would equal 0 in the column matrix in eq (4), and the force/pressure would be nonzero in a different row depending on which mode is selected. The second change is that the column matrix of 1's on the right side of eq (4) may have to have one or more −1's to compensate for the phase changes needed to excite other modes. The phase changes can be implemented by switching the polarity (which ends are connected to +− signal) of the actuators, so they still may be excited by a common source. An embodiment is shown in FIG. 4, where the second lowest mode is the one excited, and the lowest mode, among others, is minimized. "Minimize" herein does not imply a certain threshold level, but rather to minimize the excitation of unwanted (non-selected) modes. One of ordinary skill will understand that the choice of selected mode or means of implementing appropriate phase changes is not limiting on the invention herein.

The preferred goal of the method and systems described herein is to excite only the lowest panel mode using an array of actuators supplying the same forces. This means configuring Eq. (3) above such that $$\begin{bmatrix} P_1 \\ 0 \\ \vdots \\ 0 \end{bmatrix} = \begin{bmatrix} G_1(x_1, y_1) & G_1(x_2, y_2) & \ldots & G_1(x_N, y_N) \\ G_2(x_1, y_1) & G_2(x_2, y_2) & \ldots & G_2(x_N, y_N) \\ \vdots & \vdots & \vdots & \vdots \\ G_R(x_1, y_1) & G_R(x_2, y_2) & \ldots & G_R(x_N, y_n) \end{bmatrix} \begin{bmatrix} 1 \\ 1 \\ \vdots \\ 1 \end{bmatrix}. \quad (4)$$

The goal of the optimization is to determine actuator locations $(x_1, y_1)$ through $(x_N, y_N)$ such that the pressure $P_1$ is maximized and pressures $P_2$ through $P_R$ are minimized. The optimization therefore formulated as $$\underset{\Sigma_i(x_i, y_i)}{\mathrm{argmin}} \frac{\sqrt{1 + \sum_{r=2}^{R} P_r}}{P_1} \quad (5)$$

where $$0 < x_i < L_x \text{ and } 0 < y_i < L_y. \quad (6)$$

There is no explicit limit on R, the number of modes which can be scaled to an excitation pressure of zero using N actuators. Certain embodiments discussed herein use R=2N, or twice as many modes as actuators, analogous to the Nyquist rate of time-sampled data.

Computer Systems

In certain embodiments the device or system herein may be controlled and networked via a computer system, the computer system includes a memory, a processor, and, optionally, a secondary storage device. In some embodiments, the computer system includes a plurality of processors and is configured as a plurality of, e.g., bladed servers, or other known server configurations. In particular embodiments, the computer system also includes an input device, a display device, and an output device. In some embodiments, the memory includes RAM or similar types of memory. In particular embodiments, the memory stores one or more applications for execution by the processor. In some embodiments, the secondary storage device includes a hard disk drive, floppy disk drive, CD-ROM or DVD drive, or other types of non-volatile data storage. In particular embodiments, the processor executes the application(s) that are stored in the memory or the secondary storage, or received from the internet or other network. In some embodiments, processing by the processor may be implemented in software, such as software modules, for execution by computers or other machines. These applications preferably include instructions executable to perform the functions and methods described herein. The applications preferably provide GUIs through which users may view and interact with the application(s). In other embodiments, the system comprises remote access to control and/or view the system.

Methods of Use

In certain embodiments the device and systems described herein may be used in connection to sound transmission from devices including, but not limited to, mobile phones, electronic notepads, electronic tablets, electronic automobile dashboards (e.g., in ambulances or cars used for medical-related purposes), electronic motorcycle dashboards, electronic wristbands, electronic neckwear, wall-mounted screens, portable monitors (e.g. wheeled monitors in medical facilities), electronic headbands, electronic helmets, electronic eyewear (e.g. glasses with lens that can display information in real time to the wearer), electronic rings, networked computers (e.g. personal computers), remote viewing technology (e.g. rural doctor client-patient communication devices) and portable electronic devices in general. In certain embodiments, the device may be a vibrational sensor, such as a piezoelectric or PVDF sensor, or accelerometer.

The present application is further illustrated by the following examples that should not be construed as limiting. The contents of all references, including patent applications, such as U.S. application Ser. Nos. 15/255,366; 15/778,797; and U.S. Prov. App. Nos. 62/745,324; 62/745,314, cited throughout this application, as well as the Figures and Tables, are incorporated herein by reference.

EXAMPLES

Results are presented herein for actuator placement on a simulated acrylic plate which has dimensions $L_x$=38 cm, $L_y$=28 cm, and h=6 mm. The resonant frequency of each mode must be calculated so that the mode indices are properly ordered when performing the optimization routine. Assuming clamped edges, the resonant frequency of a mode with index r (corresponding to two directional indices $m_r$ and $n_r$) is calculated using an empirical formula given below [Mitchell, A. K. and Hazell, C. R., "A Simple Frequency Formula for Clamped Rectangular Plates," J. Sound Vib., 118(2), pp. 271-281, 1987]:

$$\omega_{0_r} = \sqrt{\frac{D}{\rho h}} \Psi'_r \quad (7)$$

where $$\Psi'_r = \left(\frac{(m_r + \Delta m_r)\pi}{L_x}\right)^2 + \left(\frac{(n_r + \Delta n_r)\pi}{L_y}\right)^2 \quad (8)$$

and $$\Delta m_r = \frac{1}{\left(\frac{n_r L_x}{m_r L_y}\right)^2 + 2}, \quad \Delta n_r = \frac{1}{\left(\frac{m_r L_y}{n_r L_x}\right)^2 + 2}. \quad (9)$$

For acrylic, the following material values are used: D=8:2 Pa m and p=1180 kg/m$^3$. Mode shapes take the form $$G_r(x, y) = \sin\left(\frac{m_r \pi x}{L_x}\right) \sin\left(\frac{n_r \pi y}{L_y}\right). \quad (10)$$

The optimization routine is performed using the MATLAB optimization toolbox (see, e.g., www.mathworks.com/products/optimization.html). Actuator location results are shown for several values of N actuators in the array in FIGS. 7, 8, and 9, which show certain embodiments which typically represent global optima after accounting for the fact that the ordering of the actuators is not important.

Table 1 below lists the pressure on each plate mode when every actuator is supplying 1 Pa of pressure to the panel after scaling, assuming the three driving layouts from FIGS. 7, 8, and 9. Modes in the table are listed with respect to increasing resonant frequency. Each driving layout is able to excite the (1;1) mode with a significant amount of pressure, and most other modes are driven with very little or no pressure at all. For 4 actuators, the lowest-frequency mode that is driven with a significant amount of pressure is the (5;1) mode. For 8 actuators, the lowest significant mode above the primary is the (1;5) mode. With 11 actuators, the (7;1) mode is the lowest mode significantly driven.

TABLE 1

| | Pressure on Mode (Pa) | | |
|---|---|---|---|
| Mode | 4 exciters | 8 exciters | 11 exciters |
| (1, 1) | 3.0000 | 5.7063 | 7.4813 |
| (2, 1) | 0.0000 | 0.0000 | 0.0000 |
| (1, 2) | 0.0000 | 0.0000 | 0.0000 |
| (3, 1) | 0.0000 | 0.0000 | 0.0000 |
| (2, 2) | 0.0000 | 0.0000 | 0.0000 |
| (3, 2) | 0.0000 | 0.0000 | 0.0000 |
| (4, 1) | 0.0000 | 0.0000 | 0.0000 |
| (1, 3) | 0.0000 | 0.0000 | 0.0000 |
| (2, 3) | 0.0000 | 0.0000 | 0.0000 |
| (4, 2) | 0.0196 | 0.0000 | 0.0000 |
| (3, 3) | −0.0001 | 0.0000 | 0.0000 |
| (5, 1) | −2.9999 | 0.0000 | 0.0000 |
| (1, 4) | 0.0000 | 0.0000 | 0.0000 |
| (5, 2) | 0.0000 | 0.0000 | 0.0000 |
| (4, 3) | 0.0000 | 0.0000 | 0.0000 |
| (2, 4) | −0.0196 | 0.0000 | 0.0000 |
| (6, 1) | 0.0000 | 0.0000 | 0.0000 |
| (3, 4) | 0.0000 | 0.0000 | 0.0000 |
| (5, 3) | 0.0001 | 0.0000 | 0.0000 |
| (6, 2) | −0.0391 | 0.0010 | 0.0000 |
| (4, 4) | 0.0000 | −0.0014 | 0.0000 |
| (1, 5) | −2.9999 | −5.7063 | 0.0000 |
| (7, 1) | 2.9997 | −3.5267 | −6.3498 |

Figure 7:
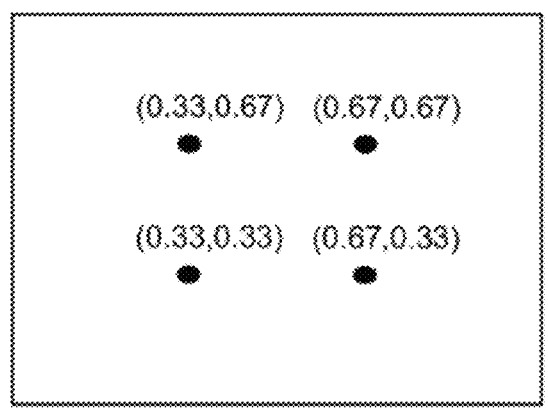
FIG. 7 shows optimized locations for four actuators on a simulated panel. Locations are shown relative to normalized dimensions.
Figure 8:
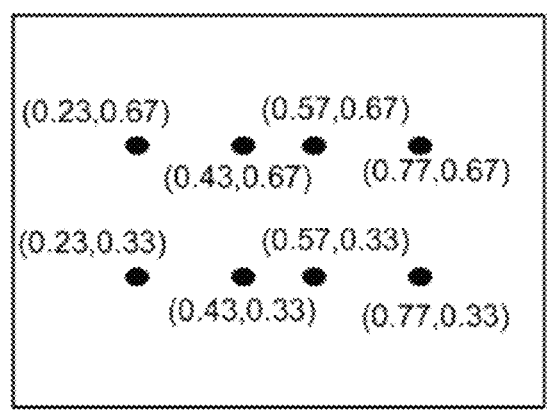
FIG. 8 shows optimized locations for eight actuators on the simulated panel. Locations are shown relative to normalized dimensions.
Figure 9:
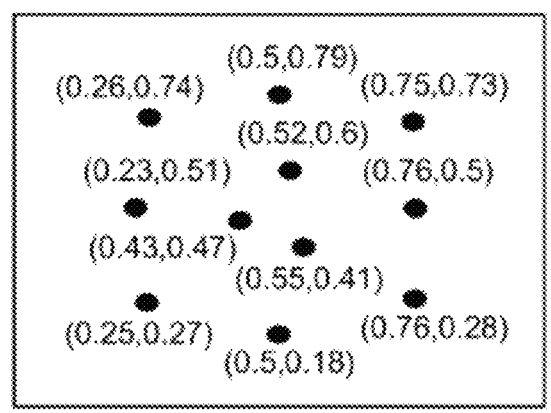
FIG. 9 shows optimized locations for eleven actuators on the simulated panel. Locations are shown relative to normalized dimensions.

Embodiments of the three optimal actuator arrays from FIGS. 7, 8, and 9 are arranged on a panel with the same parameters as were simulated in the discussion above. The commercially available actuators add weight and resonance to the panel [Anderson, D., Heilemann, M. C., and Bocko, M. F., "Flat-Panel Loudspeaker Simulation Model with Electromagnetic Inertial Exciters and Enclosures," Journal Audio Eng. Soc., 2017], as well as having an annular connection to the panel with outer radius 11 mm and inner radius 8:25 mm. These characteristics will add resonances to the panel and slightly shift the existing resonances, as well as exert a small amount of pressure on modes that are meant to be canceled out.

The panel is epoxied at its edges to a heavy wooden frame, simulating clamped boundary conditions. While a 6 mm acrylic panel is likely too heavy to make an effective speaker, the isotropic, homogeneous behavior of acrylic, its inherently high damping, and the relatively large weight when compared with the actuators make it ideal for experimental validation. As noted above, the use of acrylic is in no way limiting on the methods, systems or devices disclosed herein.

Figure 10:
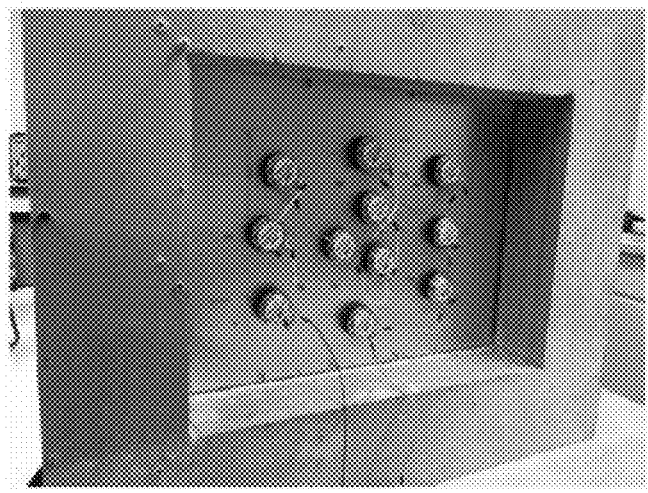
FIG. 10 shows average surface velocities and vibrometer images for the acrylic panel described in the text under excitation from a single actuator as well as the three optimized arrangements.

Different numbers of actuators in arrays produce patterns with varying impedance; often, it is impossible to chain the actuators in a series-parallel combination to give the same impedance as another array. For the arrangement with 4 actuators, two series chains of 4Ω actuators are wired in parallel to give a 4Ω load. For the 8 actuators arrangement, two series chains of 4Ω actuators are placed in parallel to give an 8Ω impedance. For the 11 actuators arrangement, all actuators are wired in series to give a 44Ω impedance. A photo of the experimental setup with 11 actuators is shown in FIG. 10. This experiment is performed using a scanning laser vibrometer at a distance of 1 m at a spatial resolution of 6:8 mm.

Figure 11:
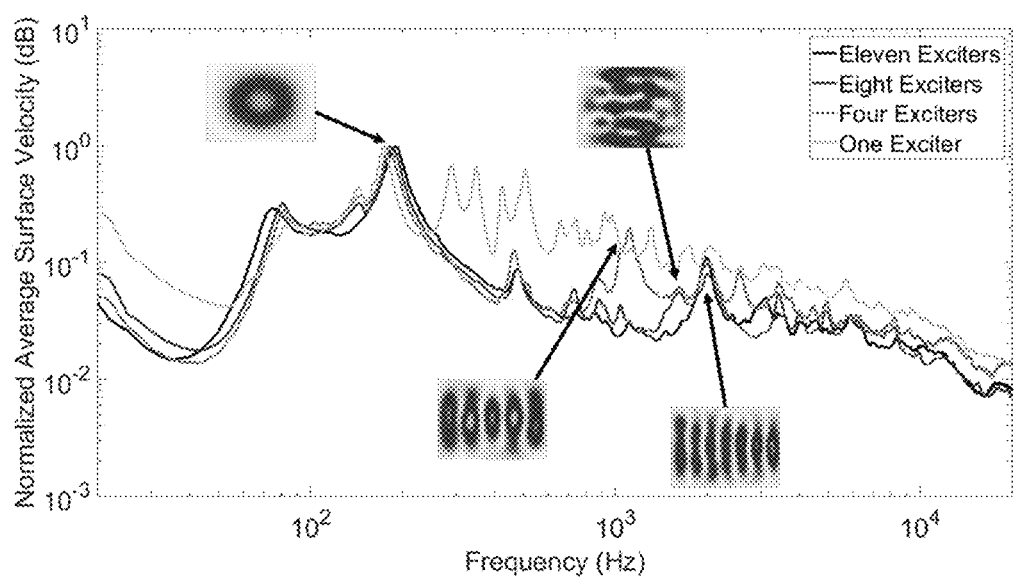
FIG. 11 shows a photo of the experimental panel setup with 11 actuators connected in series.

Shown in FIG. 11 is the average surface velocity of the panel when using each of the three optimized actuator layouts, as well as a single actuator placed at normalized location (0:37; 0:71) for comparison. FIG. 11 demonstrates that the actuator arrangements are successfully able to selectively excite only the lowest panel mode over a wide frequency band. There is a slight excitation of the (3;1) mode for each arrangement, near 500 Hz, likely due to the annular shape of the actuators. The lowest mode's resonant frequency is inconsistent between the actuator arrangements due to resonance coupling predicted in [Anderson, D., Heilemann, M. C., and Bocko, M. F., "Flat-Panel Loudspeaker Simulation Model with Electromagnetic Inertial Exciters and Enclosures," Journal Audio Eng. Soc., 2017]. It is demonstrated that the actuator arrays are successful at exciting only the lowest panel mode for a wide frequency band using commercially available actuators. These results are practically useful for implementation in flat-panel loudspeakers using a modal crossover network.

While various embodiments have been described above, it should be understood that such disclosures have been presented by way of example only and are not limiting. Thus, the breadth and scope of the subject compositions and methods should not be limited by any of the above-described exemplary embodiments, but should be defined only in accordance with the following claims and their equivalents.

The above description is for the purpose of teaching the person of ordinary skill in the art how to practice the present invention, and it is not intended to detail all those obvious modifications and variations of it which will become apparent to the skilled worker upon reading the description. It is intended, however, that all such obvious modifications and variations be included within the scope of the present invention, which is defined by the following claims. The claims are intended to cover the components and steps in any sequence which is effective to meet the objectives there intended, unless the context specifically indicates the contrary.

What is claimed is:
1. A device for radiating sound, comprising:
a panel, wherein the panel possesses one or more vibrational resonant modes;
a plurality of dynamic force actuators, wherein the dynamic force actuators are positioned in an array at optimized locations on the panel to actuate a selected mode of vibration of the panel without requiring a weighting function to excite the selected mode of vibration,
wherein the selected mode is excited when the actuators are applying equal force to the panel and non-selected modes are minimized, and
wherein the lowest panel mode is the lowest-frequency mode driven with significant force when the actuators are applying equal force to the panel; and
a common signal source, wherein the source is connected to the plurality of dynamic force actuators, and
wherein a signal is received by each of the plurality of force actuators from the common signal source, and further wherein the dynamic force produced by the plurality of force actuators upon the panel generates a radiation of sound from the panel in a selected frequency band.

2. The device of claim 1, wherein the panel is flat and has a shape selected from the group consisting of circular, rectangular or square.

3. The device of claim 1, wherein the common signal source is a single amplifier.

4. The device of claim 1, wherein the actuators are positioned on the structure to address a prescribed subset of vibrational resonant modes.

5. The device of claim 1, wherein the actuators are positioned to cancel the excitation of one or more of the panel's vibrational resonant modes included in a prescribed subset of vibrational resonant modes.

6. The device of claim 1, wherein the actuators are positioned such that they lie on nodal lines, or are so disposed in anti-nodal regions such that the net force acting on selected panel modes approaches zero.

7. The device of claim 1, wherein a prescribed modal set of vibrational resonant modes comprises of all the panel modes that resonate within a prescribed bandwidth.

8. The device of claim 1, wherein the force actuators are wired in selected series/parallel configurations to produce a target total electrical impedance.

9. The device of claim 1, wherein the array is employed in conjunction with one or more independently driven individual force actuators on the panel.

10. The device of claim 1, wherein the force actuators are electromagnetic coil drivers.

11. The device of claim 1, wherein the force actuators comprise piezoelectric materials.

12. The device of claim 11, wherein the piezoelectric materials comprise ceramic.

13. The device of claim 11, wherein the piezoelectric materials comprise organic polymers.

14. The device of claim 13, wherein the organic polymers comprise polyvinylidene fluoride (PVDF).

15. The device of claim 1, wherein the signal is selected from the group consisting of digital, analog, partially digital, and partially analog signal.

16. The device of claim 1, wherein the signal is an audio signal.

17. The device of claim 1, wherein the signal comprises information selected from one or more of speech, music, and other naturally occurring sounds, or artificially synthesize sounds.

18. A system for controlling the radiation of sounds, comprising:
    a device of claim 1;
    a programmable computer processor, wherein the computer processor is networked to the device of claim 1, and
    further wherein the computer processor controls the signal produced by the common signal source of the device.

19. The system of claim 18, further comprising a data receiver, wherein the data receiver is networked to the programmable computer processor, and
    further wherein data that is input into the system via the data receiver is transformed into the signal output by the common signal source of the device.

20. The system of claim 19, wherein data receiver is a microphone.

21. The system of claim 19, wherein the data receiver is a mobile electronic device or a vibration sensor.

22. A method of radiating sound by the device of claim 1, comprising the steps of:
    positioning the device of claim 1 inside or outside a mobile structure; and
    radiating sound using the device of claim 1 inside or outside the mobile structure.

23. The device of claim 1, wherein the dynamic force actuators are positioned in an array at optimized locations on the panel to significantly actuate only the lowest panel mode in a given frequency range.

24. The device of claim 1, wherein a modal crossover network connects the plurality of dynamic force actuators, and wherein the common signal source is connected to the plurality of dynamic force actuators via the modal crossover network.

25. The device of claim 1, wherein the selected mode is the lowest-frequency panel mode.

26. The device of claim 1, wherein the optimized locations are locations that maximize the ratio of the force on the mode that is selected to be excited versus the sum total of the forces on the modes that are non-selected.

27. A method of controlling radiation of sound, comprising the steps of:
    selecting a panel, wherein the panel possesses one or more vibrational resonant modes;
    positioning a plurality of dynamic force actuators,
    wherein the dynamic force actuators are positioned in an array at optimized locations on the panel to actuate a selected mode of vibration of the panel without requiring a weighting function to excite the selected mode of vibration,
    wherein the selected mode is excited when the actuators are applying equal force to the panel and non-selected modes are minimized when the actuators are applying equal pressure to the panel;
    linking a common signal source to the plurality of dynamic force actuators via a modal crossover network;
    receiving a signal from the common signal source, wherein the signal is received by each of the plurality of force actuators; and
    applying a dynamic force generated by the plurality of force actuators upon the panel to output a radiation of sound from the panel,
    wherein the sound is in a selected frequency band.

* * * * *